Oct. 30, 1951　　　　W. L. GRONINGER　　　　2,573,010
FARM TRACTOR DOUBLE-CLUTCH AND DRIVE
Filed July 8, 1949
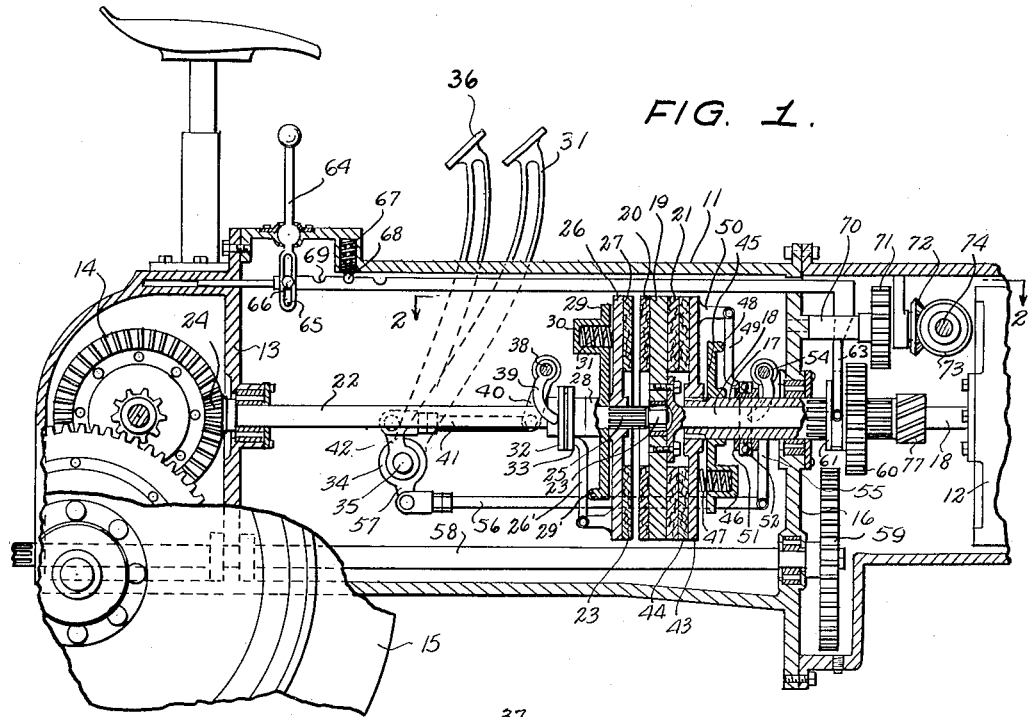
FIG. 1.
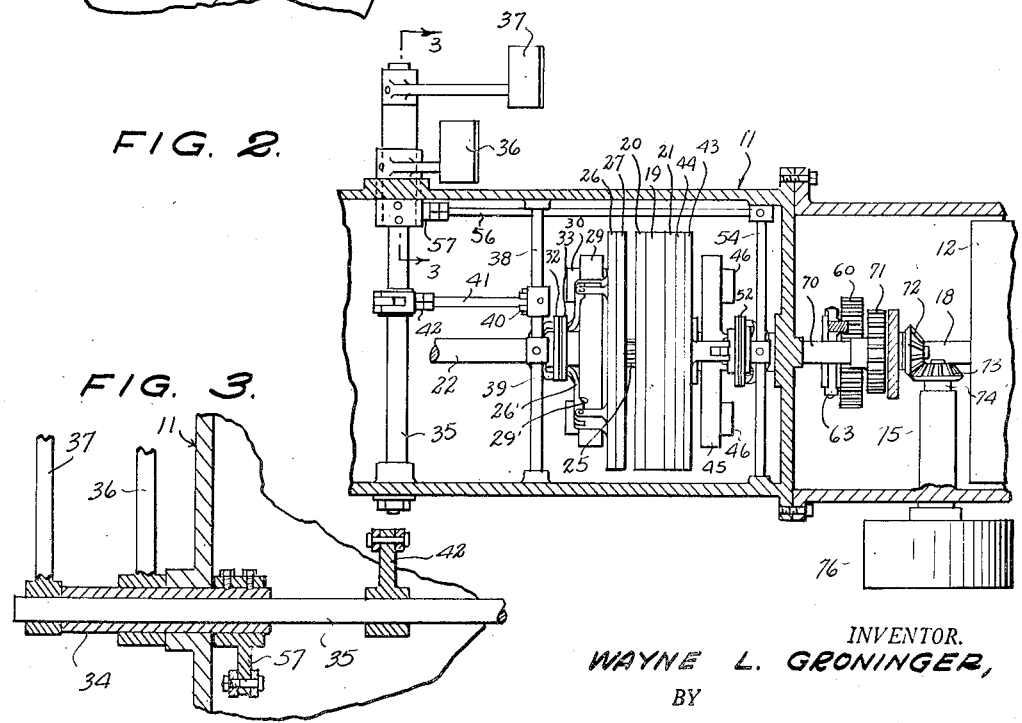
FIG. 2.
FIG. 3.
INVENTOR.
WAYNE L. GRONINGER,
BY
McMorrow, Berman + Davidson
ATTORNEYS.

Patented Oct. 30, 1951

2,573,010

UNITED STATES PATENT OFFICE 2,573,010

FARM TRACTOR DOUBLE CLUTCH AND DRIVE

Wayne L. Groninger, Silver Lake, Ind.

Application July 8, 1949, Serial No. 103,681

5 Claims. (Cl. 74—15.84)

This invention relates to clutch mechanisms, and more particularly to a double-clutch mechanism for use on a farm tractor.

A main object of the invention is to provide a novel and improved clutch mechanism for a farm tractor having a power take-off shaft, belt pulley, hydraulic pump, and the like, the mechanism enabling these devices to be driven by the engine of the tractor and enabling the operator to change ground speed or direction of travel of the tractor without retarding the motion of the power take-off shaft, belt pulley, hydraulic pump, or other auxiliary devices driven from the tractor engine.

A further object of the invention is to provide an improved double-clutch mechanism for a tractor, enabling the tractor engine to drive auxiliary devices without interfering with the normal propulsion of the tractor, said mechanism being relatively simple in construction, light in weight, involving only a few parts, and being easy to operate.

Further objects and advantages of the invention will become apparent from the following description and claims, and from the accompanying drawings, wherein:

Figure 1 is a fragmentary longitudinal cross-sectional view taken through the rear portion of a farm tractor equipped with an improved double-clutch mechanism constructed in accordance with the present invention, the ground propulsion clutch element being shown in disengaged position;

Figure 2 is a horizontal cross-sectional view taken on line 2—2 of Figure 1;

Figure 3 is an enlarged cross-sectional detail view taken on line 3—3 of Figure 2.

Referring to the drawings, 11 designates a housing forming part of the rear portion of a farm tractor. The tractor engine is designated at 12, said engine being mounted in the forward portion of housing 11. At the rear portion of housing 11 is a vertical partition wall 13, defining a rear compartment containing the differential 14 and gearing associated therewith, for coupling the differential to the rear wheels of the tractor, one of which is shown at 15.

Adjacent engine 12, the housing 11 is provided with a vertical partition wall 16. Rotatably supported in said partition wall 16 is a longitudinal sleeve member 17. The engine crankshaft, shown at 18, extends rotatably through sleeve member 17 and has secured to its end a disc member 19 provided on its opposite faces with friction rings 20 and 21.

Designated at 22 is the propeller shaft of the tractor, said shaft being axially journaled at its forward end in the center of disc 19, as shown at 23, and being journaled at its rear end portion in the partition wall 13. The rear end of shaft 22 carries the small bevel gear 24 which meshes with the main bevel gear of differential 14, as shown in Figure 1.

The forward end portion of shaft 22 is splined, as shown at 25, and has slidably mounted thereon the clutch disc 26, said disc 26 having spline teeth interengaging with splined portion 25. Disc 25 is provided with a friction ring 27 facing the friction ring 20. Rigidly secured on shaft 22 rearwardly adjacent disc 26 is a sleeve member 28 having a disc portion 29 integral therewith and disposed adjacent disc 26. Disc portion 29 is formed with cup elements 30 each containing a coil spring 31 exerting spring pressure on disc 26 and normally biasing said disc forwardly to engage ring 27 with ring 20. Rotatably and slidably mounted on shaft 22 are the bearing rings 32 and 33. Disc portion 29 is formed with an abutment 29' and disc 26 has pivotally secured thereto an arm 26' overlying said abutment and engaged at its inner end by the bearing ring 33. Forward movement of bearing ring 33 retracts disc 26, disengaging friction ring 27 from ring 20, as shown in Figure 1.

Rotatably mounted in one of the side walls of housing 11 is a transverse sleeve 34, and extending rotatably through said sleeve 34 is a transverse shaft 35 whose end is rotatably secured to the other side wall of the housing. Secured to the outer end of shaft 35 is a first foot pedal 37 and secured to the outer portion of sleeve 34 is a second foot pedal 36. Rotatably mounted in the side walls of housing 11 is a transverse shaft 38. Secured to shaft 38 are depending curved arms 39, 39 engageable with the rear bearing ring 32. Secured to said shaft is another depending arm 40. The end of arm 40 is connected by a link bar 41 to the end of an upwardly-projecting arm 42 secured to shaft 35. From Figures 1 and 3, it will be seen that when pedal 37 is depressed, shaft 35 will be rotated clockwise, causing shaft 38 to be rotated counterclockwise by arm 42, link bar 41 and arm 40. The depending yoke fingers 39, 39 also swing counterclockwise, exerting forward thrust on bearing rings 32 and 33, and causing disc 26 to be moved rearwardly, withdrawing its friction face 27 from frictional engagement with the friction face 20 of the drive disc 19, as shown in Figure 1. This disconnects propeller shaft 22 from the engine crankshaft 18. Normally, when pedal 37 is not depressed, the friction face 27 of disc 26 is engaged with the friction face 20 of disc 19 and the rear wheels of the tractor are driven.

Splined on the rear end of sleeve 17 is a slidable clutch disc 43 provided with a friction face 44 normally engaging the friction face 21 of disc 19. Secured on sleeve 17 is a disc member 45 formed with cups 46 each containing a coil spring 47 exerting rearward thrust on disc 43. Disc member 45 is formed with an abutment 48 and engaging said abutment is an arm 49 pivoted to an arm 50 projecting from the peripheral portion of disc 43. The end of arm 49 is engaged with a collar 51 rotatably and slidably mounted on sleeve 17 and provided with annular bearing rings 52 seated in the periphery thereof. Engaging the forward bearing ring 52 are the arms of a yoke 53 secured to a transverse shaft 54 journaled in the side walls of housing 11. When shaft 54 is rotated clockwise, as viewed in Figure 1, the fingers of yoke 53 move collar 51 to the left, as viewed in Figure 1, swinging arm 49 clockwise around abutment 48 and disengaging clutch face 44 from clutch face 21. Secured to shaft 54 is a depending arm 55 connected by a link bar 56 to a depending arm 57 secured to the inner end of sleeve 34. When clutch pedal 36 is depressed, sleeve 34 and arm 57 are rotated clockwise, as viewed in Figure 1, whereby link bar 56 rotates arm 55 and shaft 54 clockwise, disengaging clutch face 44 from clutch face 21, as above described.

Journaled in the lower portion of housing 11 is the longitudinal power take-off shaft 58, carrying a gear 59 at its forward end. Splined on sleeve 17 is a gear 60 which is meshingly engageable with gear 59 and which is formed with an annularly-grooved collar 61. Designated at 62 is a longitudinal bar member slidably carried in the upper portion of housing 11, as shown in Figure 1, and having a depending yoke 63 formed with fingers engaging in the groove of collar 61. Universally pivoted in the top wall of housing 11 is a lever 64 having a slotted lower portion 65 receiving a pin 66 projecting from bar member 62. The top wall of housing 11 is formed with a recess containing a spring 67 acting downwardly on a detent member 68. The bar member 62 is formed with spaced notches 69 in which the detent member 68 is receivable to releasably lock bar member 62 in selected positions of longitudinal adjustment.

Journaled in the upper forward portion of housing 11 is a longitudinal shaft 70 carrying a gear 71 with which gear 60 is meshingly engageable. A bevel gear 72 is carried at the forward end of shaft 70, said bevel gear meshing with a bevel gear 73 carried on the transverse belt pulley shaft 74. Shaft 74 is journaled in a transverse sleeve 75 integrally secured to one of the side walls of housing 11. Shaft 74 projects through said side wall and carries the belt pulley 76 on its outer end.

Figure 1 shows gears 60 in a neutral position. When lever 64 is rotated clockwise, gear 60 is engaged with gear 59, coupling the power take-off shaft 58 to sleeve 17. When said lever 64 is rotated counterclockwise, gear 60 is meshed with gear 71, coupling the belt pulley shaft 74 to sleeve 17. The detent member 68 engages the notches 69 to releasably lock bar member 62 in any one of the three selected positions of yoke 63 wherein gear 60 meshes with gear 59, is in neutral position, or meshes with gear 71. Prior to shifting the position of gear 60, pedal 37 must be depressed to disengage clutch face 44 from clutch face 21.

By depressing pedals 36 and 37 simultaneously, which the operator may do with one foot, since said pedals are located adjacent each other, driving torque may be removed from propeller shaft 22 and gear 60 may be shifted by means of lever 64 to couple either the power take-off shaft 58 or the belt pulley shaft 74 to the sleeve member 17. By releasing both pedals, the tractor may be propelled along the ground while either the power take-off shaft 58 or the belt pulley 76 is being driven from the tractor engine. By depressing pedal 36, gear 60 may be shifted while the tractor is moving along the ground.

Sleeve 17 carries a gear member 77 which may be employed to drive the fluid pressure pump of the tractor from the tractor engine.

Although a specific embodiment of a double-clutch mechanism for use on farm tractors and the like has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A tractor double-clutch mechanism of the character described comprising a housing, a first shaft extending from the tractor engine into said housing, a first clutch disc carried by said first shaft, a propeller shaft rotatably mounted in said housing in axial alignment with said first shaft, a second clutch disc slidably splined to said propeller shaft adjacent one side of said first clutch disc, means biasing said second clutch disc into frictional engagement with said first clutch disc, a sleeve rotatably mounted on said first shaft, a third clutch disc carried on said sleeve and rotated therewith adjacent the other side of said first clutch disc, means for moving said third clutch disc into frictional engagement with said first clutch disc, a slidable gear splined on said sleeve, a first auxiliary power shaft journaled in the housing, a first gear rigidly secured to said first auxiliary power shaft and arranged for meshing relation with said slidable gear, a second auxiliary power shaft journaled in the housing, a second gear rigidly secured to said second auxiliary power shaft and arranged for meshing relation with said slidable gear, and shifter means carried by the housing and engaging said slidable gear, said shifter means being formed and arranged to selectively move the slidable gear into meshing engagement with either said first gear or said second gear.

2. A tractor double-clutch mechanism comprising a housing, a drive shaft operatively extending from the tractor engine into said housing, a first clutch disc circumposed on the drive shaft, a propeller shaft rotatably journaled in said housing in axial alignment with said drive shaft, a second clutch disc slidably splined on said propeller shaft on one side of the first clutch disc, means mounted on the shaft for biasing said second clutch disc into frictional engagement of the first clutch disc, means for urging said second clutch disc out of engagement with the first clutch disc, a sleeve rotatably circumposed on the shaft on the other side of the first clutch disc, a third clutch disc fixedly mounted concentrically on the sleeve, means normally urging the third clutch disc into frictional engagement of the first clutch disc, means for urging said third clutch disc out of engagement with the first clutch disc, a drive gear slidably mounted on the sleeve for rotation therewith, a first power take-off shaft rotatably journalled in the housing parallel with the propeller shaft, a first driving gear fixed on said shaft and engageable with the drive gear upon shifting of the latter, a second power take-off shaft in said housing, a second driven gear fixed on said second power take-off shaft and engageable with the drive gear, said second driven gear being spaced longitudinally from the first driven gear and positioned in parallelism therewith, and means for sliding said drive gear on the sleeve for selective engagement with the first and second driven gears.

3. A tractor double-clutch mechanism comprising a housing, a drive shaft operatively extending from the tractor engine into said housing, a first clutch disc circumposed on the drive shaft, a propeller shaft rotatably journaled in said housing in axial alignment with said drive shaft, a second clutch disc slidably splined on said propeller shaft on one side of the first clutch disc, means mounted on the shaft for biasing said second clutch disc into frictional engagement of the first clutch disc, means for urging said second clutch disc out of engagement with the first clutch disc, a sleeve rotatably circumposed on the shaft on the other side of the first clutch disc, a third clutch disc fixedly mounted concentrically on the sleeve, means normally urging the third clutch disc into frictional engagement of the first clutch disc, means for urging said third clutch disc out of engagement with the first clutch disc, a drive gear slidably mounted on the sleeve for rotation therewith, a first power take-off shaft rotatably journaled in the housing parallel with the propeller shaft, a first driven gear fixed on said shaft and engageable with the drive gear upon shifting of the latter, a second power take-off shaft in said housing, a second driven gear fixed on said second power take-off shaft and engageable with the drive gear, said second driven gear being spaced longitudinally from the first driven gear and positioned in parallelism therewith, and means for sliding said drive gear on the sleeve for selective engagement with the first and second driven gears, both of said means for urging the second and third clutch discs out of frictional engagement with the first clutch disc having operating levers companionly mounted exteriorly of the housing for individual or companion application.

4. A tractor double clutch mechanism comprising a housing, a drive shaft operatively extending from the tractor engine into the housing, a first clutch disc circumposed on the shaft, a propeller shaft rotatably journaled in the housing in axial alignment with the drive shaft, a second clutch disc slidably splined on the propeller shaft, a plate circumposed on the propeller shaft parallel to the second clutch disc, resilient means laterally extending from the plate and engaging the second clutch disc for urging it into frictional engagement of one side of the first clutch plate, a member slidably mounted on the propeller shaft, links pivotally connecting the member and second clutch plate for moving said second clutch plate out of engagement with the first clutch plate upon movement of the member relative to the second clutch plate, a linkage for actuating said member, a transverse shaft rotatably mounted in the housing and receiving said linkage, said shaft extending exteriorly of the housing, a first foot lever fixed on said extending end of the shaft for rotating the shaft to actuate the linkage, a sleeve slidably mounted on the drive shaft on the other side of the first clutch disc, a drive gear splined on the sleeve, power take-off shafts having spaced fixed gear ends selectively engageable by the drive gear, means for shifting said drive gear into said selective engagement, a third clutch disc circumposed on the sleeve, means for urging said third clutch disc into frictional engagement of the first clutch disc, means for releasing said third clutch disc from said engagement, said last means including an actuating linkage paralleling the linkage for the second clutch disc and a collar rotatably mounted on the shaft and receiving the linkage and a second foot lever on said collar positioned alongside the first foot lever.

5. A clutch mechanism comprising a housing, a drive shaft extending into said housing, a first clutch disc circumposed on the drive shaft, a first driven shaft in said housing in axial alignment with the drive shaft, a second clutch disc slidably splined on the first driven shaft for frictional engagement with one side of the first clutch disc, means carried by said driven shaft for urging said second clutch plate into said engagement, a linkage slidably carried by the driven shaft for releasing said second clutch plate from said engagement, a sleeve slidably mounted on the drive shaft on the other side of the first clutch disc, a drive gear slidably splined on the sleeve, a plurality of driven shafts having gear ends selectively engaged by the drive gear, means for shifting said gear for said selective engagement, a third clutch disc fixedly circumposed on the sleeve for frictional engagement of the first clutch disc, means carried by the sleeve for normally urging said third clutch disc into said engagement, release means carried by the sleeve, a linkage for actuating said release means, a shaft transversely mounted in the housing and companion levers for said linkages mounted on the shaft for individual or simultaneous application.

WAYNE L. GRONINGER.

REFERENCES CITED

The following references are of record in the file of this patent:

UNITED STATES PATENTS

| Number | Name | Date |
|---|---|---|
| 1,887,355 | Kranick | Nov. 8, 1932 |
| 2,261,432 | Cooke | Nov. 4, 1941 |
| 2,276,000 | Stumpf | Mar. 10, 1942 |
| 2,287,279 | Stumpf | June 23, 1942 |